United States Patent
Owen et al.

[19]

[11] Patent Number: 5,902,018
[45] Date of Patent: May 11, 1999

[54] HUBCAP LOCKING DEVICE

[75] Inventors: Robert H. Owen, Columbia City; Devlin J. Barnes, Winona Lake; Bruce E. Harrison, Warsaw, all of Ind.

[73] Assignee: Spartech Industries, Inc., Warsaw, Ind.

[21] Appl. No.: 08/906,057

[22] Filed: Aug. 5, 1997

Related U.S. Application Data

[60] Provisional application No. 60/023,543, Aug. 7, 1996.
[51] Int. Cl.$^6$ .................................................. B60B 37/00
[52] U.S. Cl. ............................................ 301/111; 301/122
[58] Field of Search ............................ 301/108.1, 108.3, 301/111, 112, 119, 121, 122, 120

[56] References Cited

U.S. PATENT DOCUMENTS

| 1,540,508 | 6/1925 | White | 301/122 X |
| 2,615,759 | 10/1952 | Becker | 301/112 |
| 4,043,685 | 8/1977 | Hyams | 301/121 X |
| 5,215,356 | 6/1993 | Lin | 301/108.1 X |
| 5,277,480 | 1/1994 | Chiu | 301/111 |
| 5,358,314 | 10/1994 | Spadotto | 301/111 |

*Primary Examiner*—Russell D. Stormer
*Attorney, Agent, or Firm*—Baker & Daniels

[57] ABSTRACT

A wheel assembly which includes a wheel having a central bore and an attached hubcap. An axle is fitted into the central bore of the wheel assembly and interlocks with the hubcap, serving to secure the wheel assembly to the axle while permitting movement of the wheel relative to the axle.

14 Claims, 12 Drawing Sheets

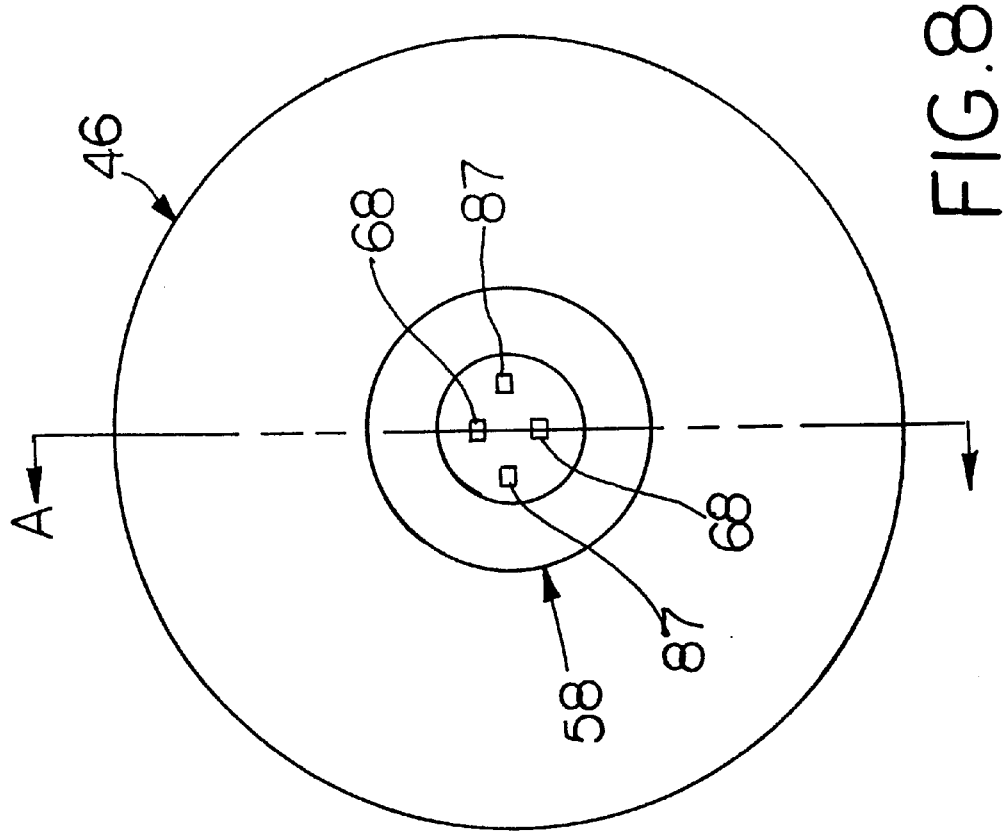
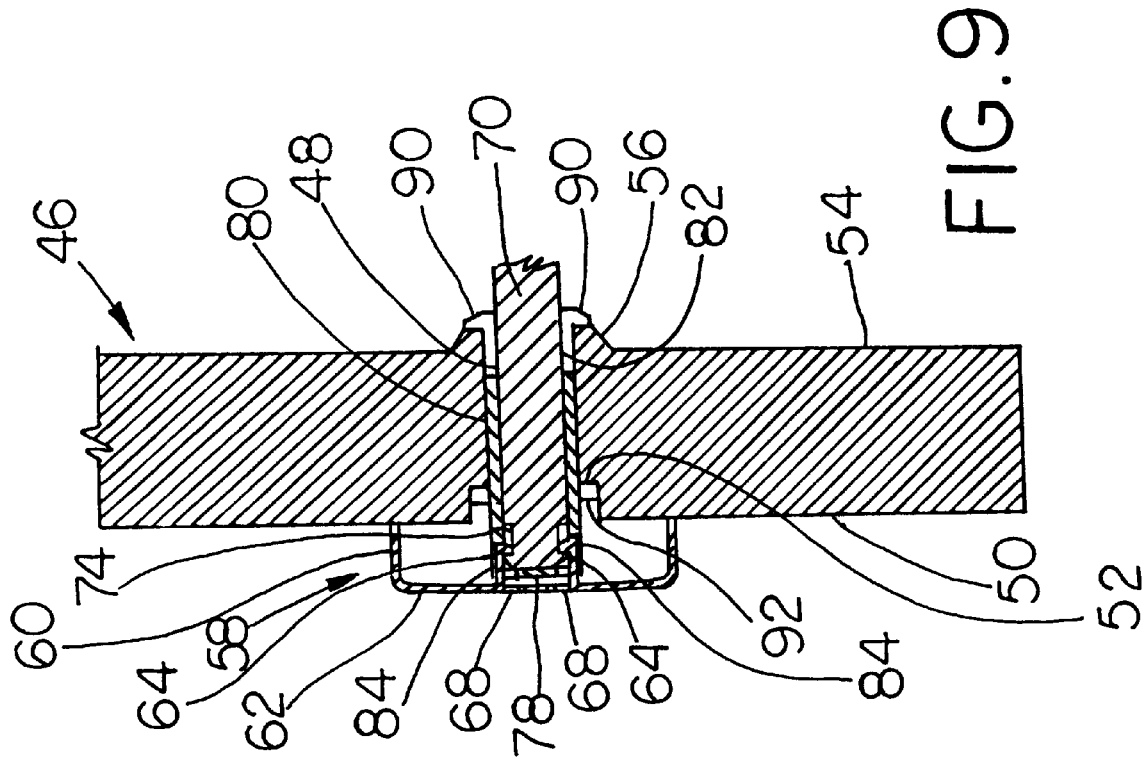

HUBCAP LOCKING DEVICE

This application claims domestic priority based on U.S. Provisional Application Ser. No. 60/023,543, filed Aug. 07, 1996.

SUMMARY OF THE INVENTION

This invention relates to a wheel assembly having particular, but not limited, application to wheels utilized on portable trash carts, wagons, lawn and garden equipment, and toy objects.

Heretofore wheels, which are formed generally of injection molded plastic having a tire component, have been attached to an axle by either a locking washer or a spring clip. Locking washers are of a domed construction which are press fitted over the end of the axle and include teeth components which bite into or interlock with the axle serving to retain the journalled wheel. When using a spring clip component, the clip component is applied to the outer surface of the journalled wheel and interlocks with the axle and wheel. The clip component is hidden from view by a hub which is then placed over the clip and attached to the outer surface of the wheel. Each of these prior art type axle to wheel interlocking devices have certain drawbacks. The forced-fit interlocking washer commonly used is difficult to remove and generally requires the replacement of the washer if it becomes necessary to remove a wheel for repair or servicing. The interlocking arrangement which utilizes the separate spring clip is of a three piece multiple component assembly, adding to the cost of the assembly as well as requiring that the hubcap be first removed before access to the spring clip can be obtained to release the wheel from the axle.

In the following described invention, the wheel assembly includes a wheel having a central bore and a connected hubcap. This hubcap includes opposing fingers which extend through openings in the wheel and interlock with the axle at an annular groove formed in the axle when the axle is inserted into the wheel bore. In this manner, the axle is retained against axial displacing movement relative to he wheel by the hub. Openings may be provided in the hub to obtain accessibility by way of snapring pliers or similar type of probe, to cause the fingers of the hub to be released from the axle if it becomes necessary to remove the wheel for servicing or replacement.

Accordingly, it is an object of this invention to provide an economical interlock between a wheel and an axle which can be easily assembled.

Another object of this invention is to provide a wheel and axle assembly having an axle to wheel interlock which can be easily applied to lock the wheel to the axle, as well as simply disconnected to release the wheel from the axle if necessary.

Another object of this invention is to provide a wheel assembly for a cart or similar transportable object which retards vandalism and theft of the wheels of the assembly.

Other objects of the invention will be come apparent upon a reading of the following description.

BRIEF DESCRIPTION OF THE DRAWINGS

FIG. 8 is a outer face view of the wheel assembly of FIG. 7.

FIG. 9 is a cross-sectional view taken along line A—A of FIG. 8.

DESCRIPTION OF THE PREFERRED EMBODIMENTS

Figure 1:
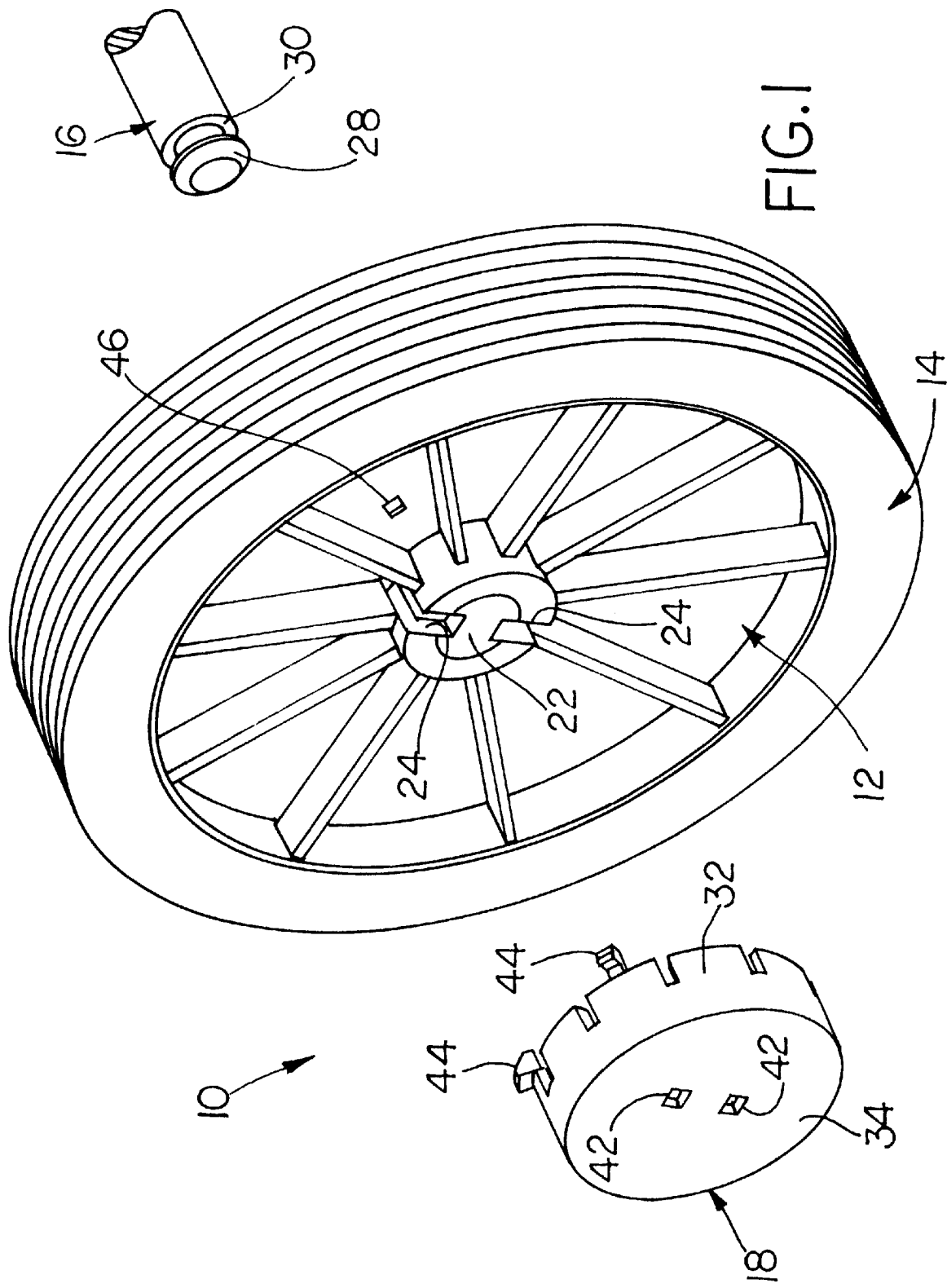
FIG. 1 is an exploded view of the component parts of one embodiment of the wheel assembly.
Figure 2:
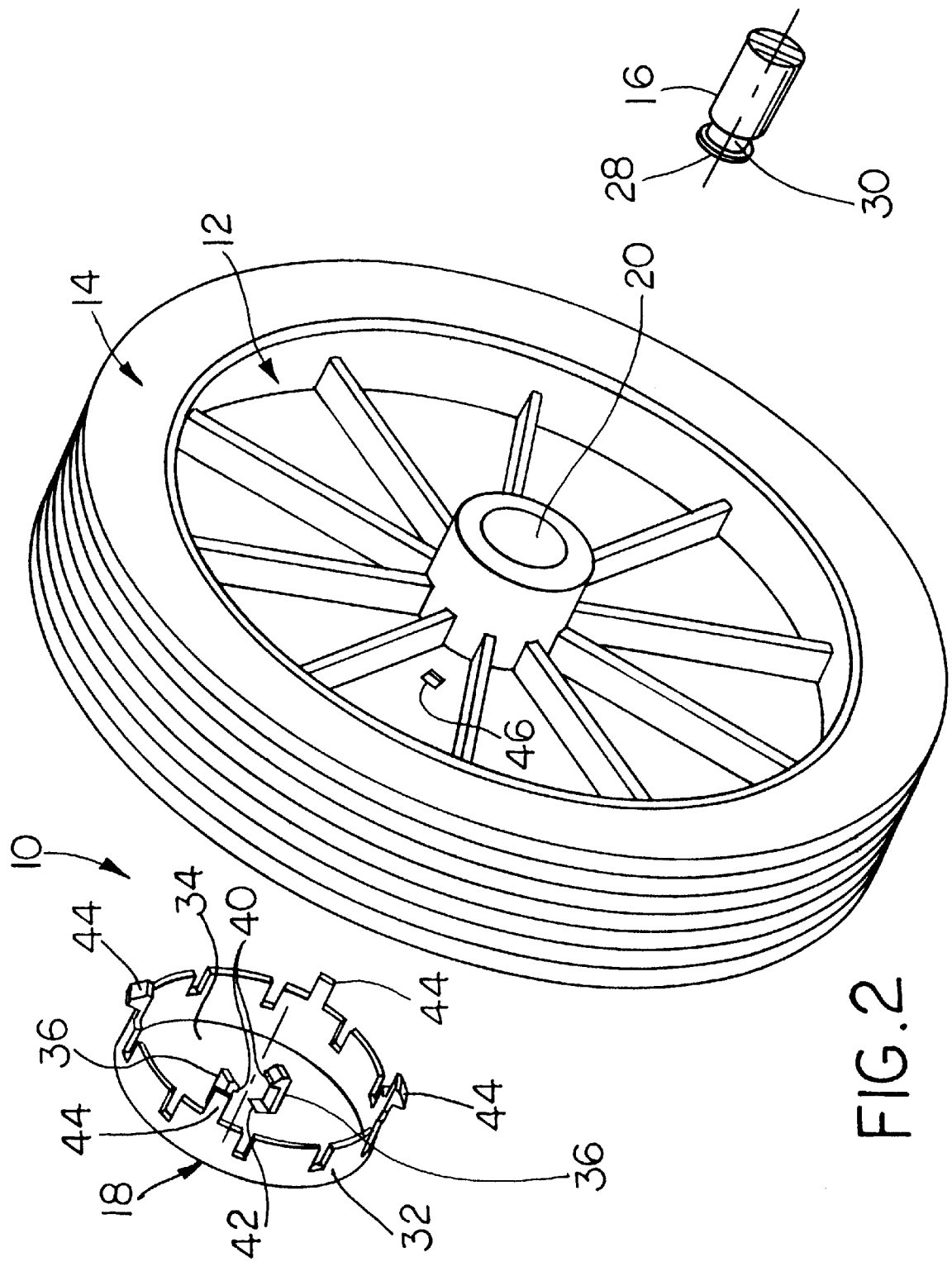
FIG. 2 is an exploded view of the component parts of the embodiment of FIG. 1 but as seen from the opposite direction.
Figure 3:
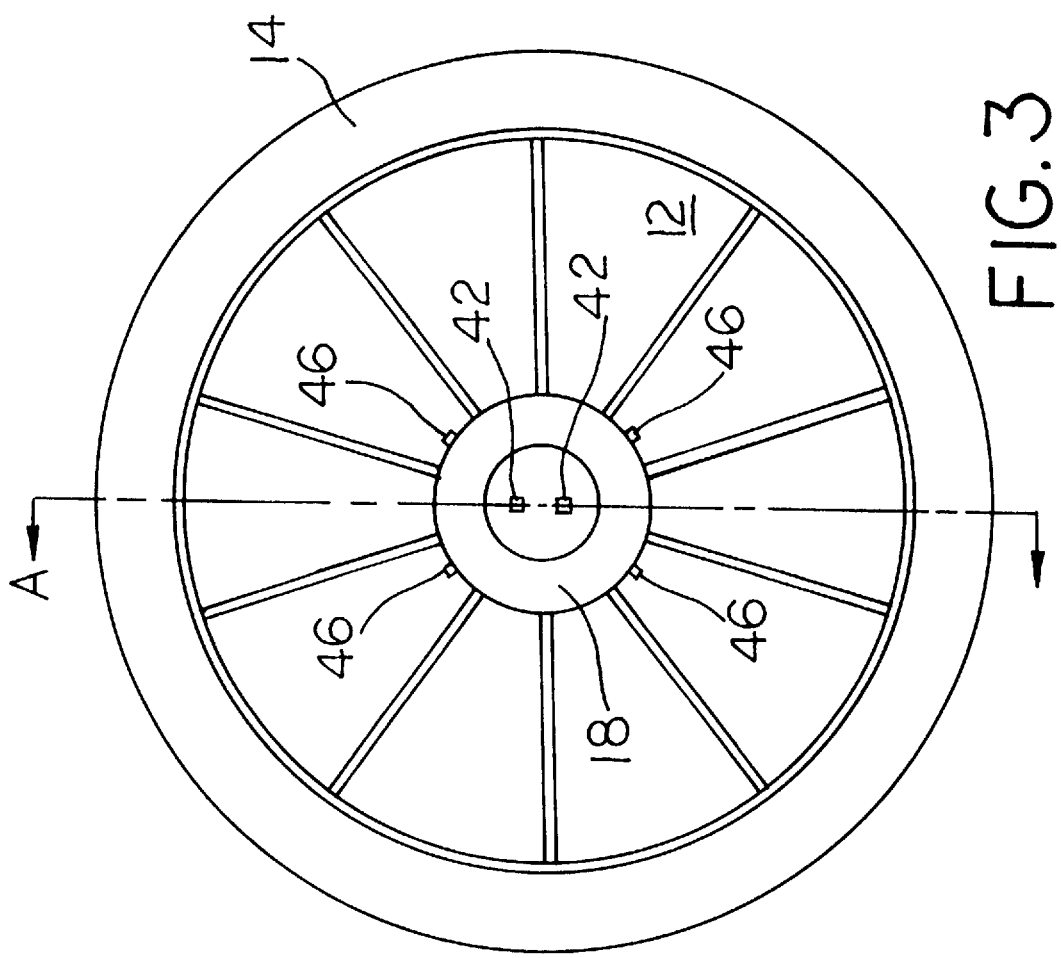
FIG. 3 is an outer face view of the wheel assembly of FIG. 1.
Figure 4:
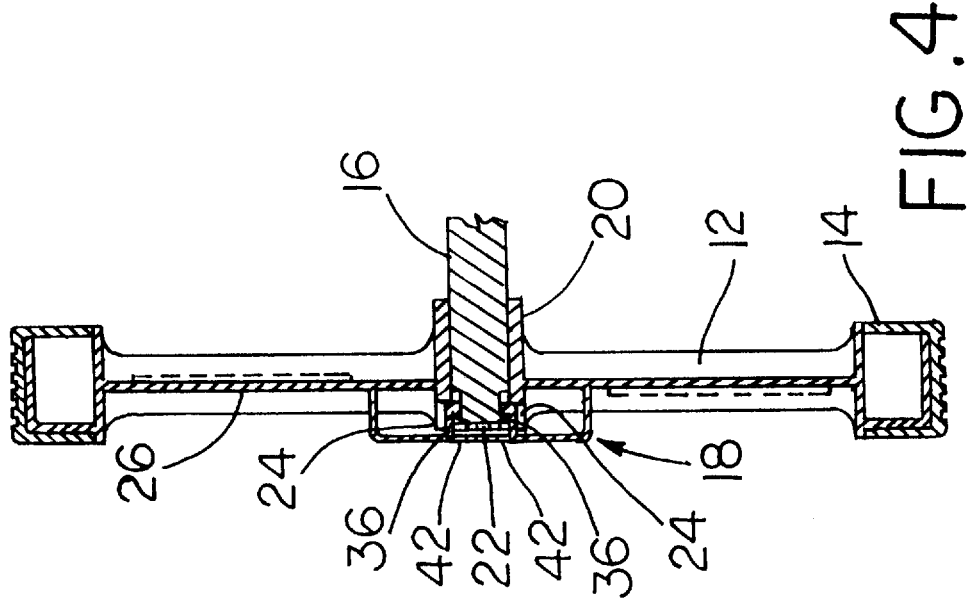
FIG. 4 is a cross-sectional view taken along line A—A of FIG. 3.
Figure 5:
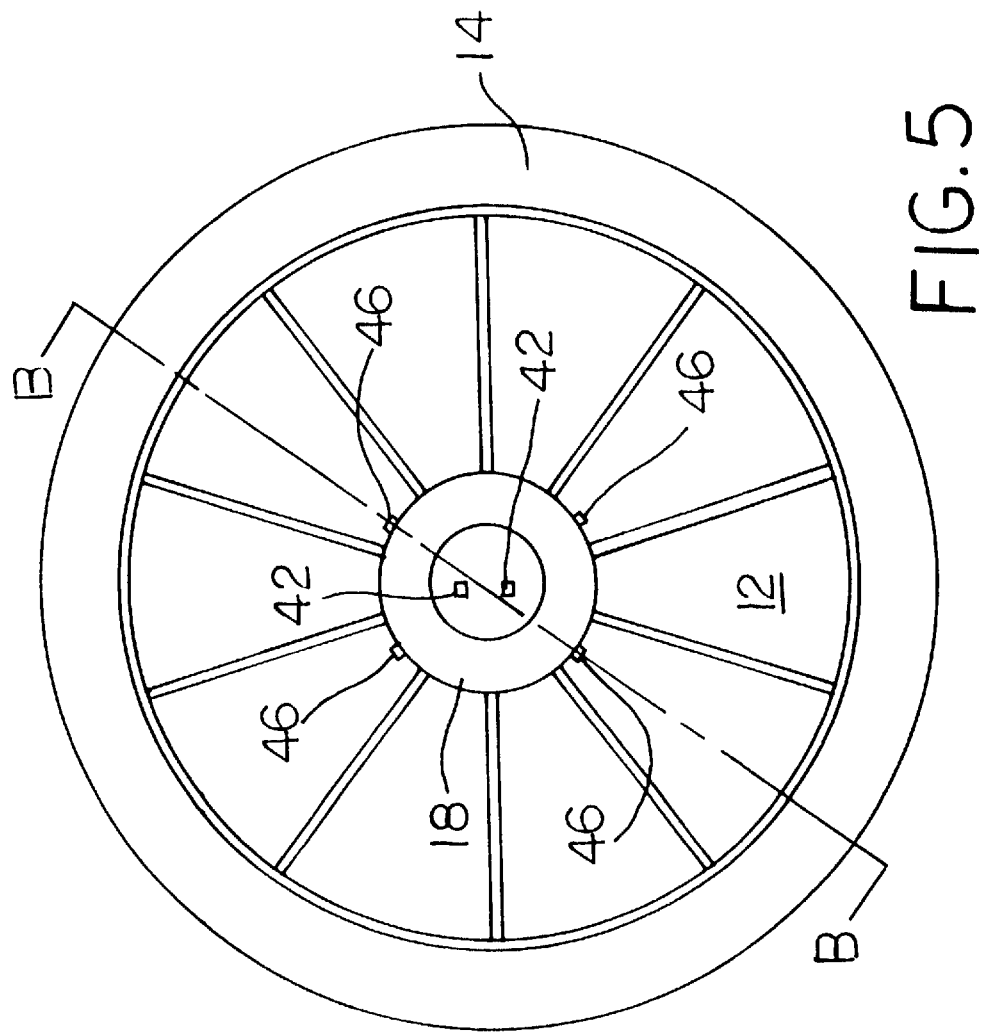
FIG. 5 is an outer face view of the wheel assembly of FIG. 1.
Figure 6:
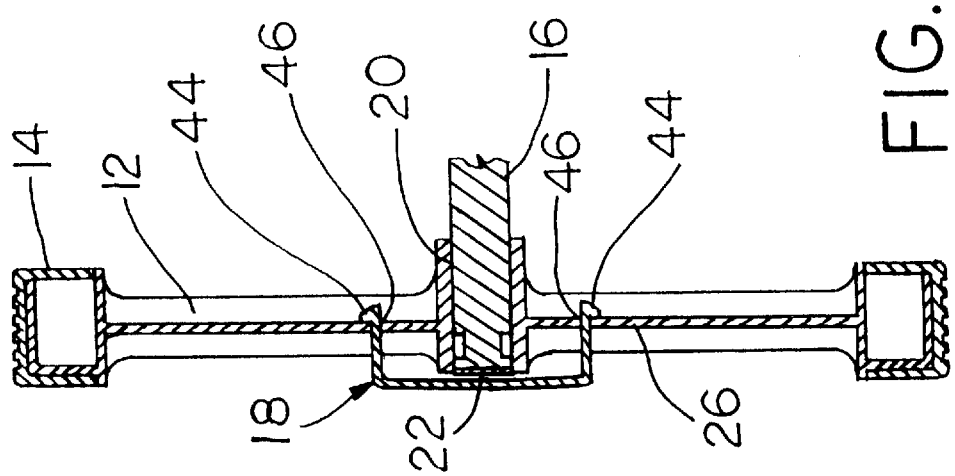
FIG. 6 is a cross-sectional view taken along line B—B of FIG. 5.
Figure 7:
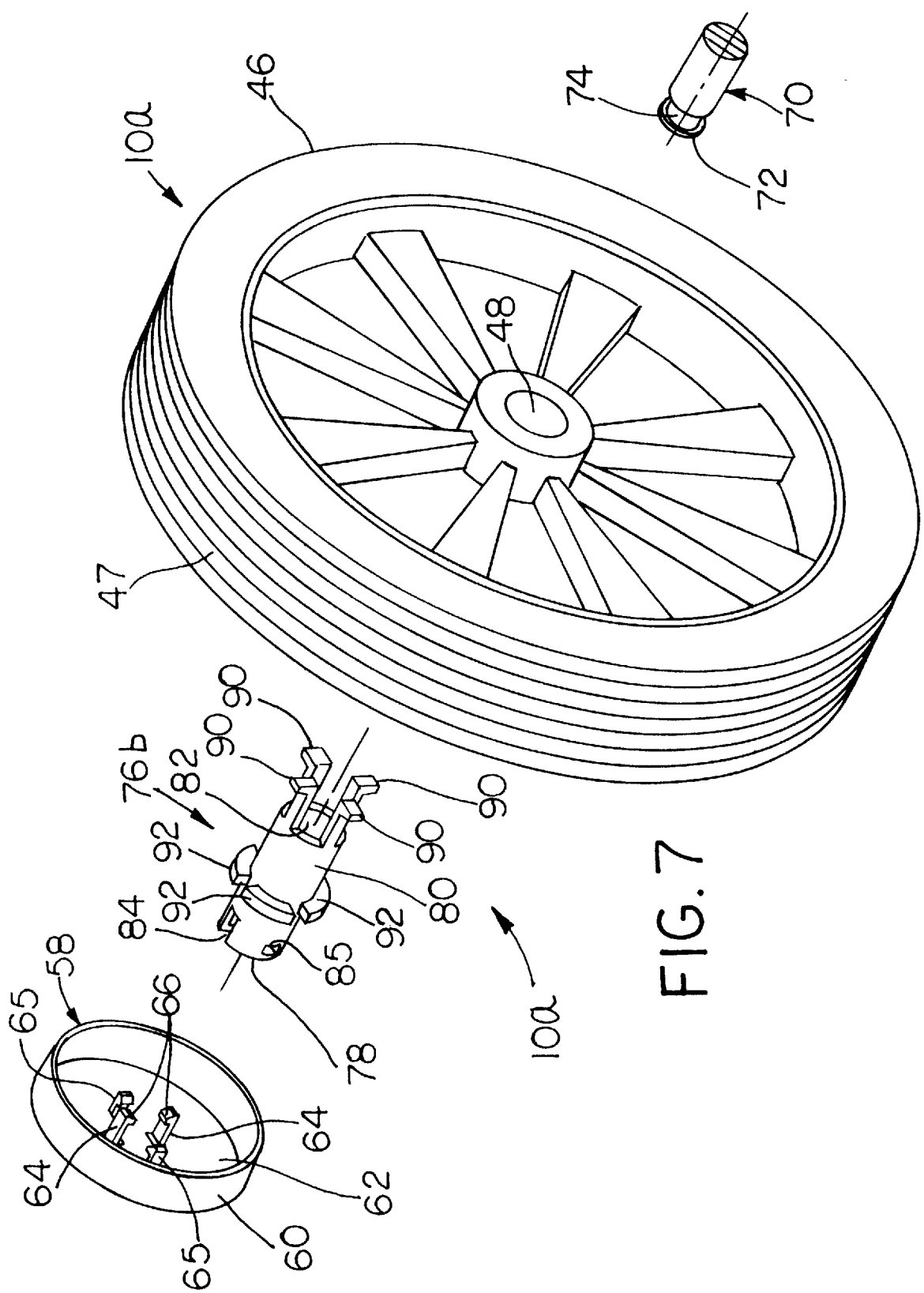
FIG. 7 is an exploded view of the component parts of another embodiment of the wheel assembly.
Figure 10:
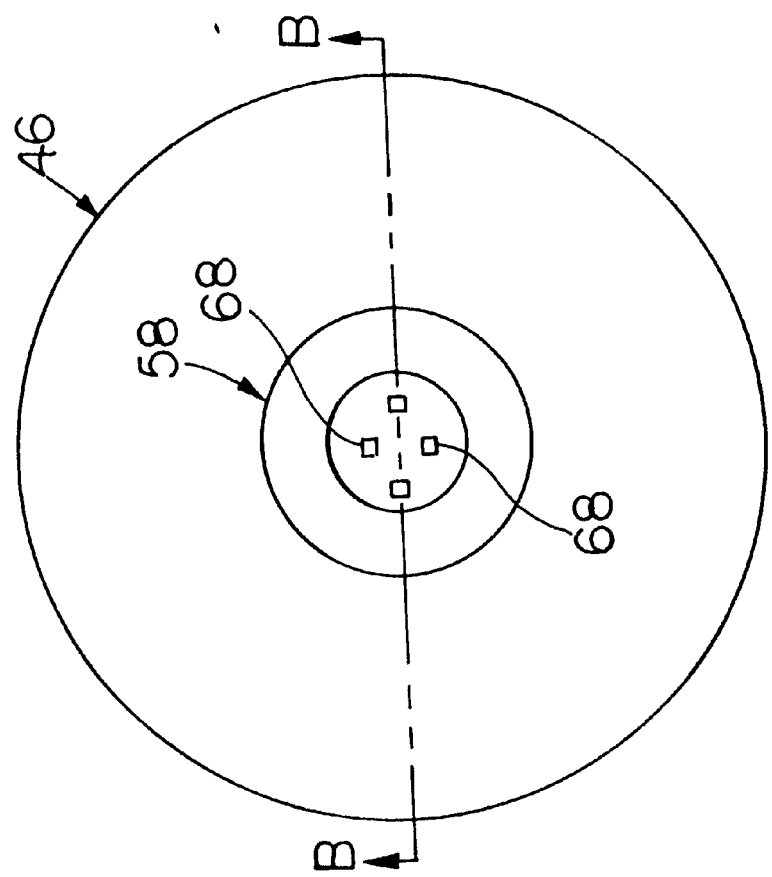
FIG. 10 is an outer face view of the wheel assembly of FIG. 7.
Figure 11:
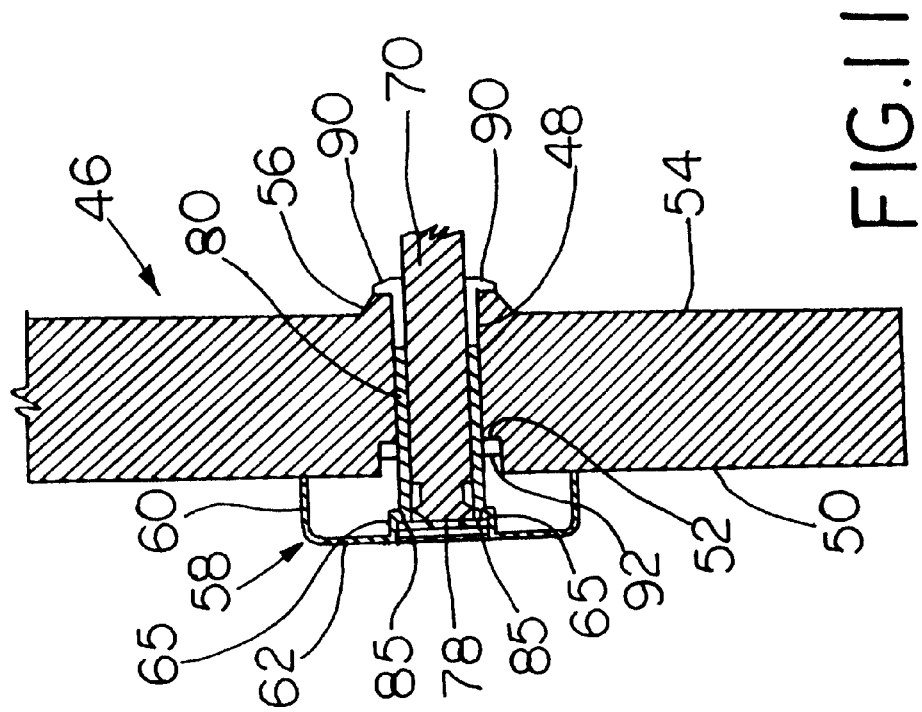
FIG. 11 is a cross-sectional view taken along line B—B of FIG. 10.
Figure 12:
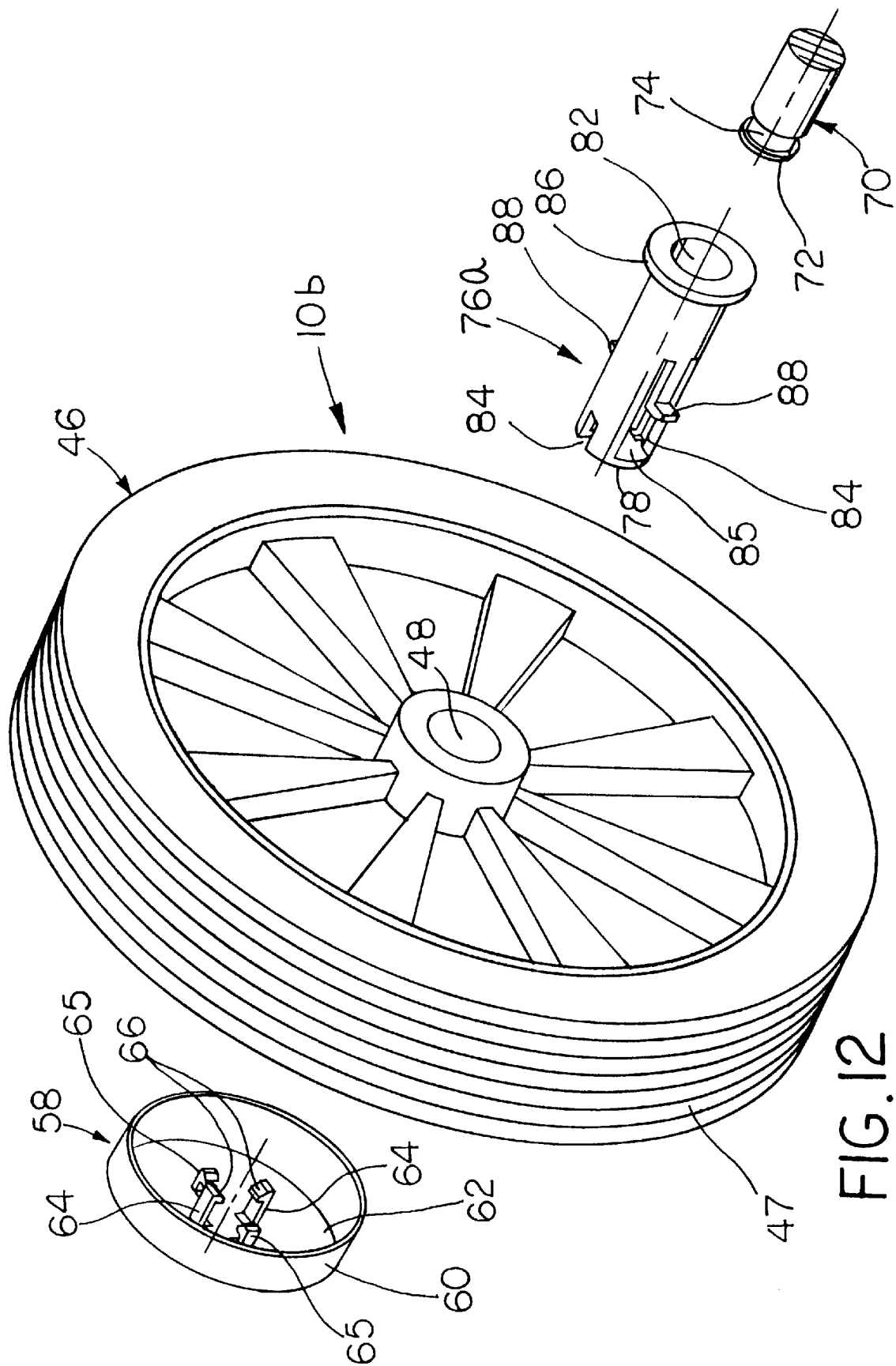
FIG. 12 is an exploded view of the component parts of another embodiment of the wheel assembly.
Figure 13:
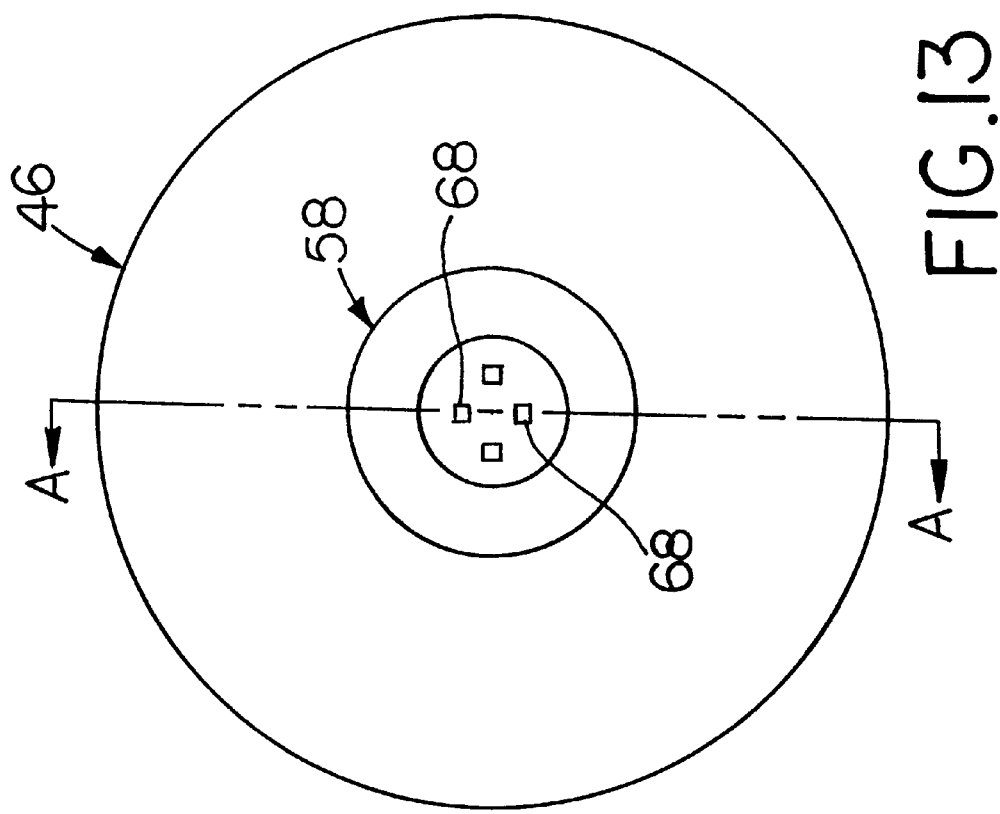
FIG. 13 is an outer face view of the wheel assembly of FIG. 12.
Figure 14:
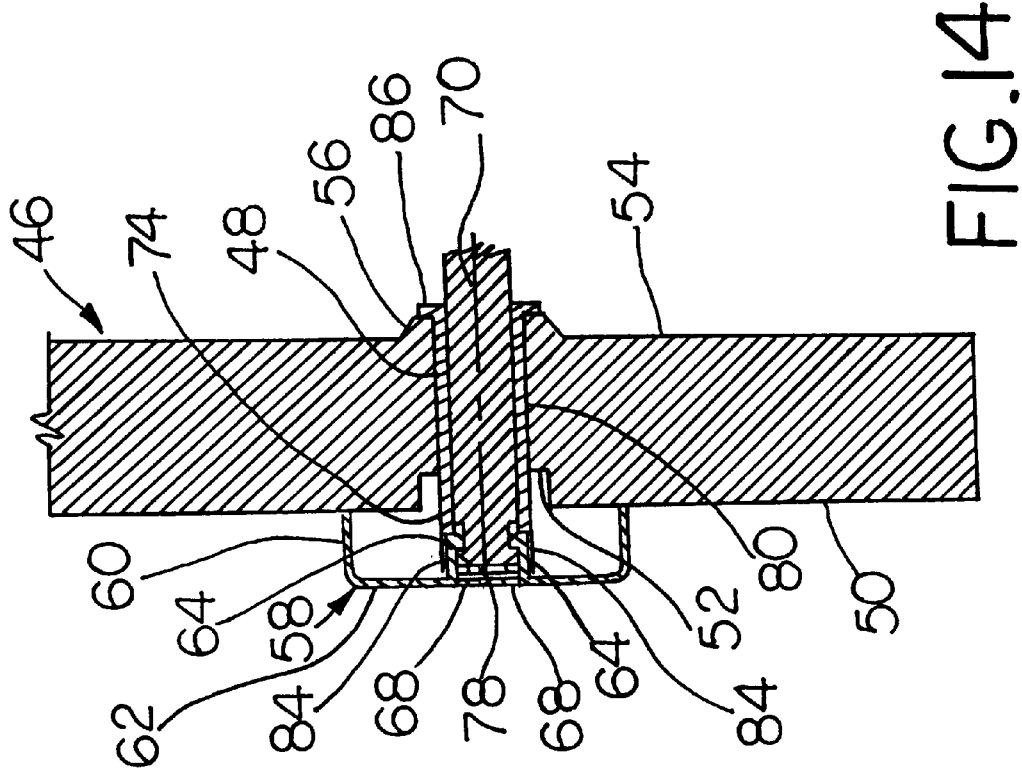
FIG. 14 is a cross-sectional view taken along line A—A of FIG. 13.
Figure 15:
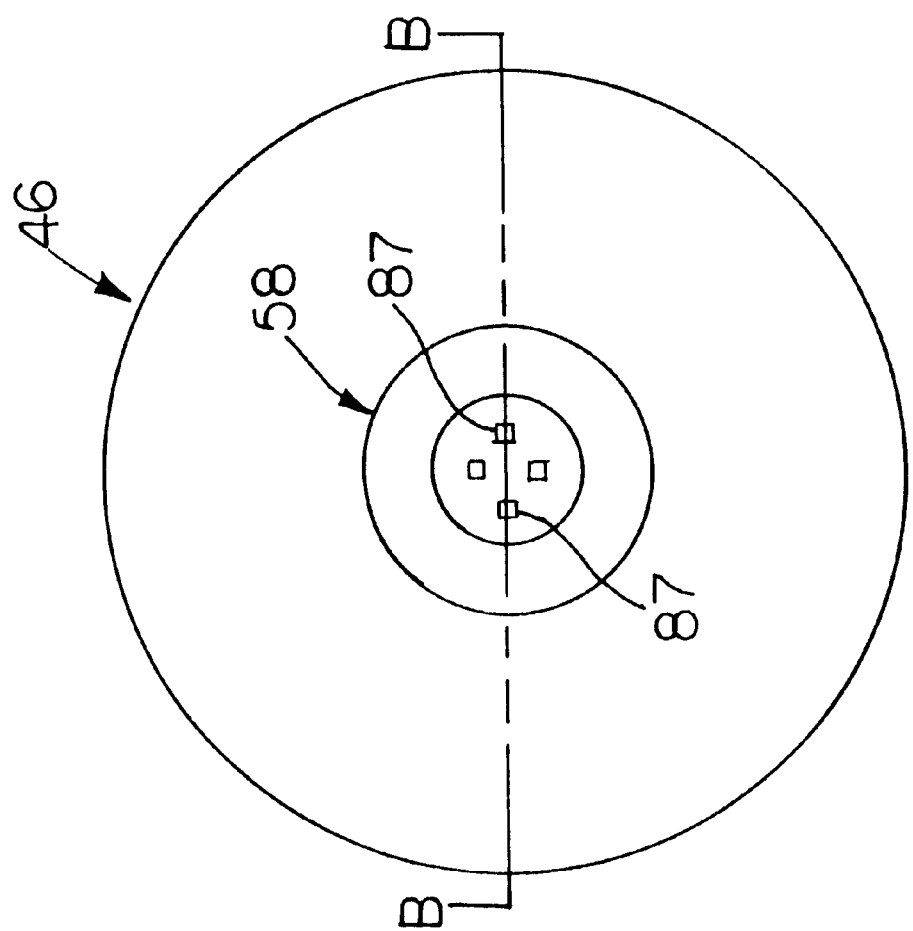
FIG. 15 is an outer face view of the wheel assembly of FIG. 12.
Figure 16:
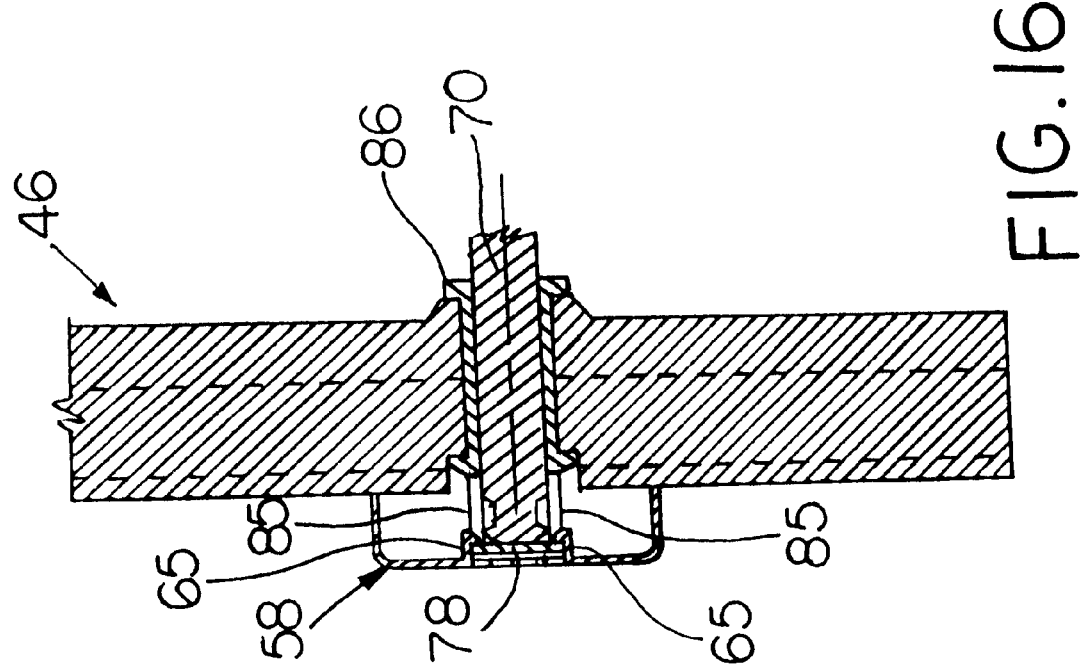
FIG. 16 is a cross-sectional view taken along line B—B of FIG. 15.

The preferred embodiments, which are to be described, were chosen for purposes of illustration and description to enable others having ordinary skill in the art to best utilize the invention.

The wheel assembly 10 shown in FIGS. 1–4 includes a wheel 12 carrying a tire 14, an axle 16 and a hubcap 18 having a locking device. Wheel 12, and also tire 14, may be formed of injection molded plastic and includes a central bore 20 which terminates in an end wall 22 forming an integral part of the wheel. Two diametrically positioned openings 24 are formed in wheel 12, with each extending from the outer side 26 of the wheel about end wall 22 and into bore 20.

Axle 16 at its end 28 is provided with an annular groove 30. Hubcap 18, which may also be formed of injection molded plastic, is cup-shaped having an annular side wall 32 and an end wall 34. Two opposing fingers 36 extend interiorly from end wall 34 and terminate in opposing hooks 40. Located in end wall 34 of hubcap 18 are two openings 42, each appearing next to and interiorly of a finger 36. Hubcap 18 also preferably includes tabs 44 located at equally angularly spaced locations about the end edge of hubcap side wall 32. Tabs 44 are snap-fitted into accommodating openings 46 in the wheel to secure hubcap 18 to outer side 26 of wheel 12. This allows preassembly of the hubcap and wheel which thus as a unit can be connected to the axle. Side wall 32 of hubcap 18 straddles any ribs or other reinforcing protrusions of the wheel.

To assemble the wheel assembly 10, axle 16 is inserted at its end 28 into bore 20 of wheel 12 until it abuts end wall 22 of the wheel. With hubcap 18 being previously connected to the wheel with its fingers 36 extending into openings 24 in the wheel, hooks 40 of fingers 36 slide over the beveled end of the axle 16 as the axle is inserted, causing the fingers to be flexed outwardly relative to each other over the axle until the fingers are snap-fitted into annular groove 30 of the axle. In this manner the axle is fixedly secured to the wheel assembly with the wheel assembly being able to rotate relative to the axle.

To disassemble the wheel 12 from axle 16, a snapring plier or similar probe is inserted into openings 42 of the hubcap, brought along the inside of each finger 36 and pried outwardly to flex or move the finger outwardly, thus, freeing hooks 40 from groove 30 in the axle. In this manner, the axle may be slid coaxially outwardly from bore 20 in the wheel.

For wheels which are blow molded or compression molded instead of injection molded, it may not, and usually is not, possible to form the integral end wall with openings into the wheel bore to permit the hubcap to be interlocked with an inserted axle. Thus to accommodate this change in construction of the wheel, wheel assemblies 10a and 10b are provided as shown in drawings 7 and 12. Wheel part 46 in each of the embodiments of wheel assemblies 10a and 10b include a tire 47 and a coaxial thru bore 48. The outer side 50 of wheel part 46 is preferably recessed about bore 48 so as to form an internal annular shoulder 52 and the inner side 54 of the wheel is provided with a flattened neck 56 which protrudes outwardly from the side.

The hubcap 58 used in each of the wheel assemblies 10a and 10b is cup-shaped and includes a side wall 60 and an end wall 62. Protruding interiorly within the hubcap from end wall 62 are spaced fingers 64 terminating in opposing hooks 66. A pair of openings 68 is formed in end wall 62 of hubcap 58 located adjacently inwardly of fingers 64. Also, the hubcap includes an additional pair of spaced fingers 65 generally paralleling fingers 64 but radially offset and angularly displaced therefrom. Axle 70 of each wheel assembly 10a, 10b has at its one end 72 an annular groove 74.

In order to accommodate the interlocking arrangement between hubcap 58 and wheel part 46 in wheel assemblies 10a and 10b, a sleeve 76a used in assembly 10a and a sleeve 76b used in assembly 10b is provided. Each sleeve 76a and 76b includes an end wall 78 which in conjunction with side wall 80 of the sleeve forms an internal bore 82. Slotted openings 84 are formed in side wall 80 of each sleeve 76a and 76b at the sleeve's end wall 78 in a diametrically opposite relationship. Openings 85 are formed in side wall 80 adjacent the sleeve end wall in an opposed relationship and angularly offset from openings 84.

Sleeves 76a and 76b differ in construction in the following manner. Sleeve 76a has at its end oppositely located from end wall 78 an annular out turned flange 86. A pair of diametrically located oppositely extending fingers forming hook parts 88 protrude from sleeve side wall 80 at an inwardly spaced location from the sleeve end wall 78. Hook parts 88 are flexible which permits sleeve 76a to be inserted into bore 48 of wheel part 46 from inner side 54 of the wheel causing the hook parts to be flexed inwardly, thereby allowing passage of the sleeve through the bore until flange 86 of the sleeve is fully seated against the end of neck 56 of the wheel, allowing hook parts 88 to be flexed outwardly over shoulder 52 of the wheel, thus, interlocking the sleeve to the wheel.

Sleeve 76b has two pairs of oppositely located out turned fingers forming hook parts 90 at the opposite end of the sleeve from end wall 78. Hook parts 90 are also flexible. Tabs or flanges 92 protrude outwardly from sleeve side wall 80 at a position inwardly spaced from end wall 78 of sleeve 76b. Sleeve 76b is constructed so as to enable it to be inserted and interlocked with wheel part 46 by being inserted initially into bore 48 of the wheel from the outer side 50 of the wheel with hook parts 90 being flexed inwardly to allow passage of the sleeve through the bore. When flanges 92 butt or rest against shoulder 52 of the wheel, hook parts 90 are then enabled to flex outwardly over the flattened end of neck 56 of the wheel, thus securely interlocking sleeve 76b to the wheel 46.

In each of the wheel assemblies 10a and 10b with sleeves 76a and 76b fixedly interlocked with wheel part 46, as described, the assembly is completed by preferably first attaching a hubcap 58 to the sleeve. This is accomplished by fitting the hubcap over the sleeve at its end wall 78 with fingers 65 snap-fitting into sleeve openings 85. With the hubcap 58 so attached, fingers 64 protrude into sleeve openings 84 with finger hooks 66 extending in sleeve bore 82. Axle 70 is then inserted into sleeve bore 70 until the end of the axle abuts sleeve end wall 78 with hubcap fingers 64 being flexed outwardly over the bevelled end of the axle and snap-fitted into axle groove 74 to interlock the wheel to the axle. Snapring pliers can be inserted through hubcap openings 68 to flex the fingers 64 from axle groove 74 to release the wheel from the axle. Openings 87 are provided in hubcap 58 to allow the release of the hubcap from the wheel.

Figure 17:
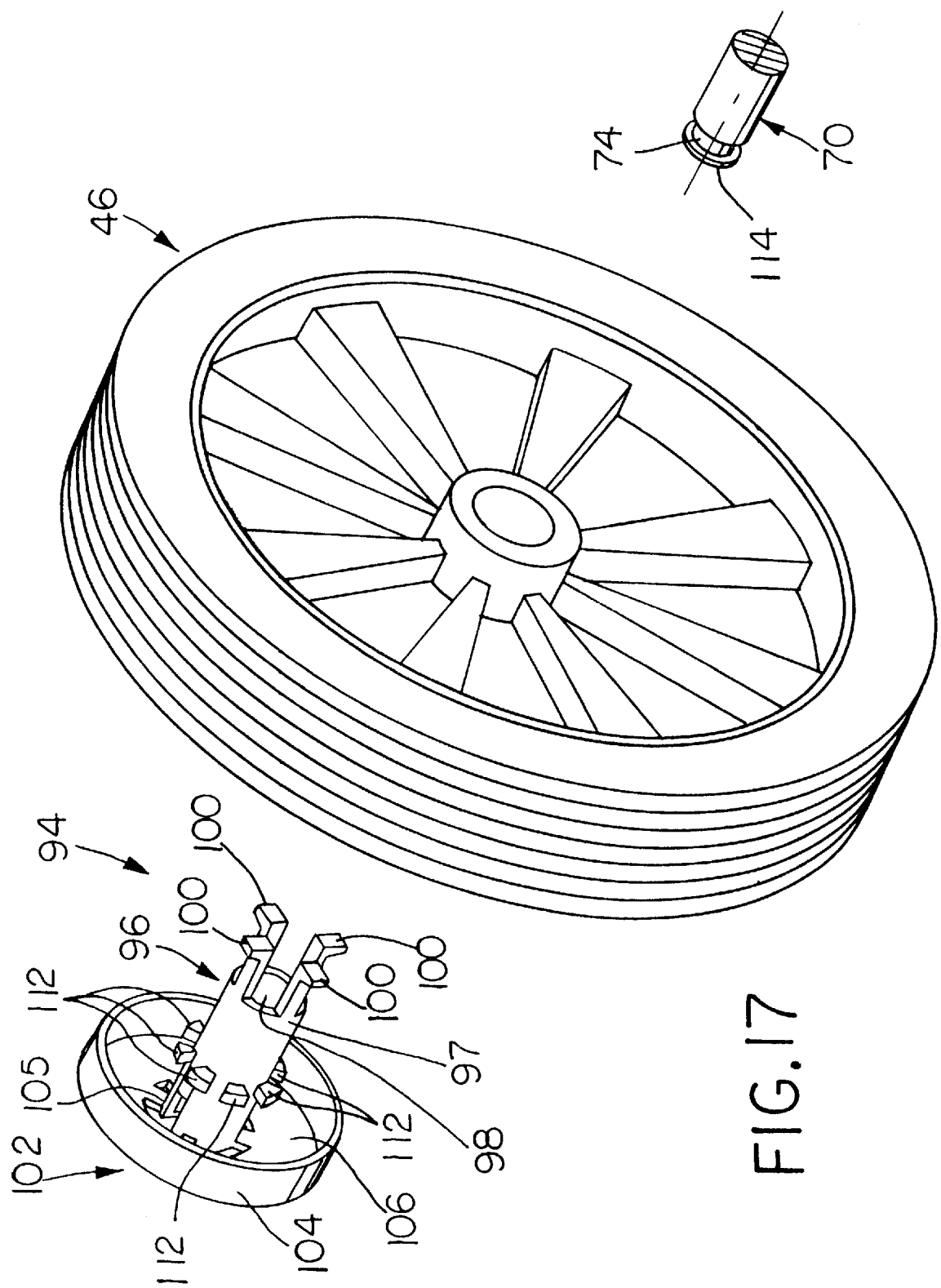
FIG. 17 is an exploded view of the component parts of still another embodiment of the wheel assembly.
Figure 18:
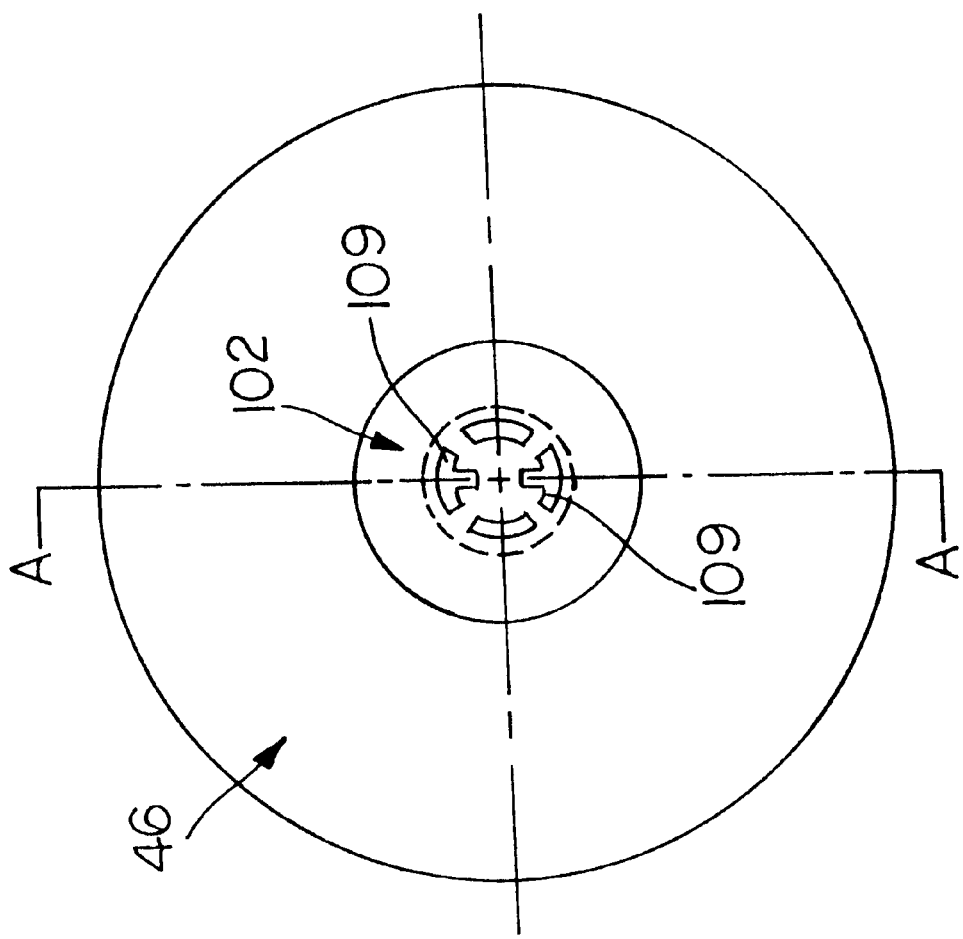
FIG. 18 is an outer face view of the wheel assembly of FIG. 17.
Figure 19:
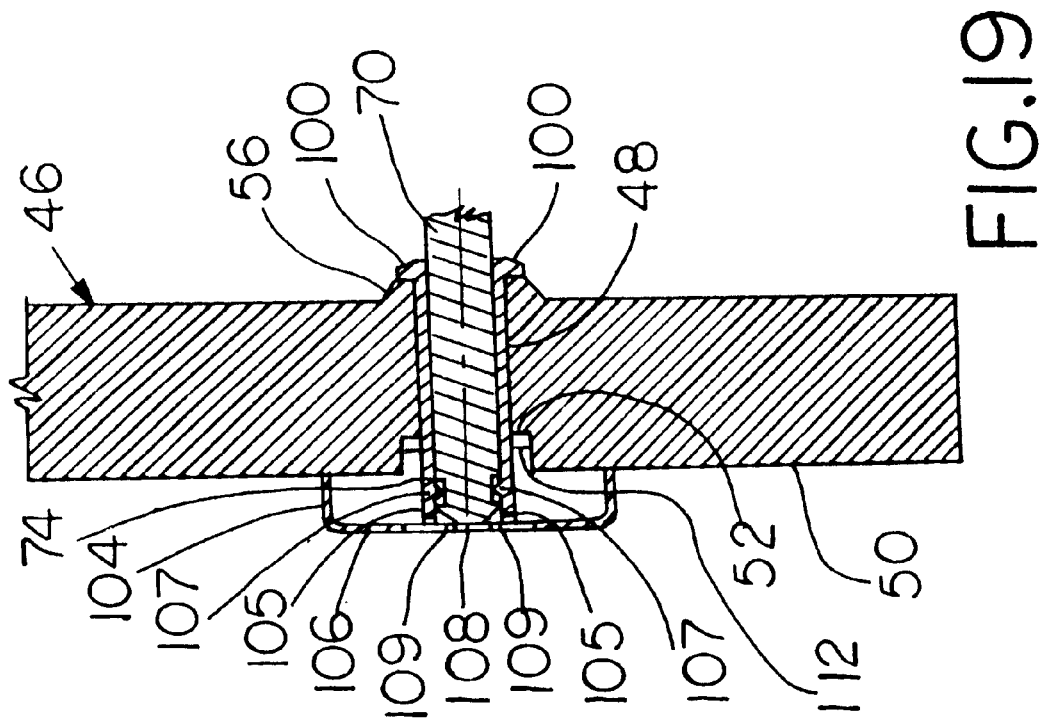
FIG. 19 is a cross-sectional view taken along line A—A of FIG. 18.

In the embodiment identified as wheel assembly 94 shown in FIGS. 17 and 18, wheel part 46 and axle 70 are of the same constructions as described for the embodiments of wheel assemblies 10a and 10b. Therefore their description in detail will not be repeated. Sleeve 96 of this embodiment includes a central bore 98 having at one end outwardly protruding hook parts 100 which are diametrically located in pairs. The opposite end of sleeve 96 includes an integral hubcap part 102 having a side wall 104 and an end wall 106 which is joined with the end wall 108 of sleeve 96. Formed between wall 106 of hubcap part 102 and the side wall 97 of the sleeve are two opposed flexible ribs 105 which include opposing tabs 107. A pair of openings 109 are formed near the integral junction of end wall 106 of the hubcap part and end wall 108 of the sleeve so as to allow access to ribs 105 after assembly of the sleeve to the wheel and axle. Oppositely protruding flanges 112 extend from sleeve 96 inwardly of ribs 104.

To assemble the wheel assembly 94, sleeve 96 with integrally connected hubcap part 102 is inserted into bore 48 of wheel part 46 from outer side 50 causing hook parts 100 to be flexed to allow the passage of the sleeve through the bore until flanges 112 of sleeve 96 contact or butt shoulder 52 of the wheel which allows hook parts 100 to flex outwardly and overly the flat end of neck 56 of the wheel part. In this manner, the sleeve is fixedly interlocked to wheel 46 with hubcap part 102 covering the wheel bore 48 as shown. Axle 70 is then inserted into bore 98 of sleeve 96 and pushed toward hubcap part 102 with the tapered end face 114 of the axle contacting tabs 107 causing the tabs to be spread and then snapped-fitted over the end face and into an interlocking arrangement with groove 74 of the axle. In this manner, the wheel is locked to the axle yet permitted to rotate relative thereto. To release axle 70 from the wheel, snapring pliers can be inserted through the openings 109 to flex the ribs outwardly to release rib tabs 107 from axle groove 74.

To hide or cover the access openings in the hubcaps, a label or similar covering can be adhered to the outer surface of the hubcap end wall and applied over the access openings. Should it become necessary to remove the wheel, the covering can be removed to expose the access openings and allow the hubcap tabs to be pried from the axle groove.

In each of the aforedescribed embodiments, a label or some other removable covering can be placed over the hubcap end wall to cover the access openings therein, if desired.

What is claimed:

1. Wheel assembly comprising a wheel having a central bore, an axle having an end thereof extending into said bore, and a hubcap having an end wall extending transversely with respect to said bore, said hubcap including first attachment means extending from said endwall and engaging said wheel for locking the hubcap to the wheel and second attachment means extending into said bore for engaging said axle, said end of the axle including cooperating latching means for latching the second attachment means to the axle.

2. Wheel assembly as claimed in claim 1, wherein said bore terminates in an end surface extending transversely across said bore, said end of said axle being adjacent said end surface.

3. Wheel assembly as claimed in claim 1, wherein said first attachment means includes lugs extending from the hubcap securing the hubcap to said wheel.

4. Wheel assembly as claimed in claim 3, wherein said second attachment means includes fingers extending from said end wall into said bore, said fingers engaging said axle.

5. Wheel assembly as claimed in claim 4, wherein said end of the axle terminates in a beveled end and a groove offset axially from said beveled end, said beveled end being adapted to deflect said fingers as the axle is installed in the bore to permit the fingers to engage the groove.

6. Wheel assembly as claimed in claim 1, wherein said second attachment means includes fingers extending from said end wall into said bore, said fingers terminating in hooks engaging said axle.

7. Wheel assembly as claimed in claim 6, wherein said end of the axle terminates in a beveled end and a groove offset axially from said beveled end, said beveled end being adapted to deflect said fingers as the axle is installed in the bore to permit the fingers to engage the groove.

8. Wheel assembly as claimed in claim 6, wherein said fingers extend through openings in said wheel.

9. Wheel assembly as claimed in claim 2, wherein said wheel includes a wheel part and a sleeve received in said wheel part, said sleeve including said end surface, and interlocking means for interlocking said sleeve with the wheel part.

10. Wheel assembly as claimed in claim 9, wherein said interlocking means include a pair of tab sets projecting outwardly from said sleeve, one of said tab sets engaging one side of said wheel part, the other tab set engaging an opposite side of the wheel part.

11. Wheel assembly as claimed in claim 10, wherein one of said tab sets include fingers spaced circumferentially and extending axially with respect to said sleeve, said fingers being deflectable inwardly with respect to said sleeve.

12. Wheel assembly as claimed in claim 10, wherein said first attachment means includes lugs engaging apertures in said sleeve.

13. Wheel assembly as claimed in claim 9, wherein said sleeve is attached to said hubcap.

14. Wheel assembly as claimed in claim 9, wherein said sleeve is formed integrally with said hubcap.

* * * * *